J. H. Reed,
Fruit Slicer.

N°51,479. Patented Dec. 12, 1865.

Witnesses:
Edward H. Knight
W. F. Hall

Inventor:
James H. Reed
by
Munn & Co.
Atty

UNITED STATES PATENT OFFICE.

JAMES H. REED, OF KENT COUNTY, DELAWARE.

FRUIT-SLICER.

Specification forming part of Letters Patent No. 51,479, dated December 12, 1865.

*To all whom it may concern:*

Be it known that I, JAMES H. REED, of the county of Kent and State of Delaware, have invented a new and useful Improved Fruit-Slicer; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1:
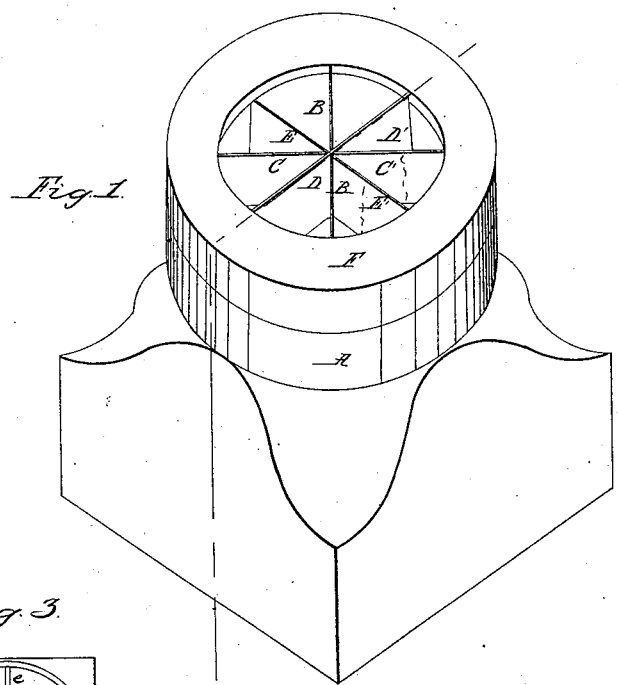
Figure 3:
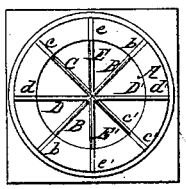
Figure 2:
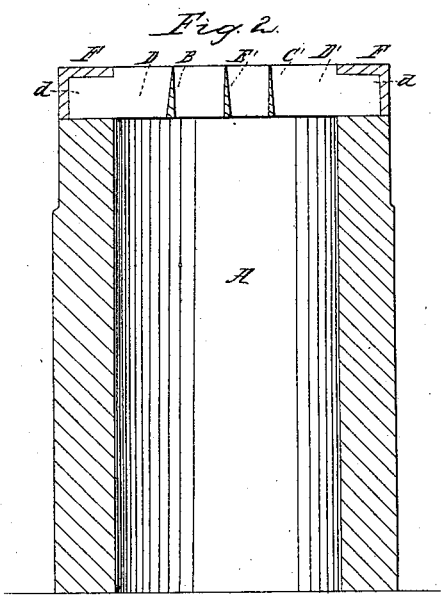

Figure 1 is a perspective view. Fig. 2 is a vertical central sectional view. Fig. 3 is a plan of the face of the slicer, the collar being removed.

My improvement consists of a tool so constructed with a series of removable and radiating knives attached to a hollow mandrel and kept in position by a collar that a peach (previously stoned) or an apple laid thereon may be driven through the slicer formed by the series of knives, and so divided into as many pieces as required, according to the number of blades therein.

In the drawings, A is a cylinder or hollow mandrel to be set on a bench or table, the latter being provided with a hole through which the slices are discharged. It may be set in a trough or a hopper, this question being determined by the convenience of manipulation and ready access to the fruit under treatment. Inserted into the upper edge of this cylinder are a series of knives whose edges are presented upward. The knife B extends all the way across, while the knives D C E D' C' E' are only radial, extending from the center outward. The ends of the knives $b$ $b$ $d$ $c$ $e$ $d'$ $c'$ $e'$ are embedded in the wood, and the knives are retained in their places by a collar, F, which sets upon the ends denoted in small letters, and also embraces the upward end of the cylinder, its inner edge agreeing with the inner periphery of the cylinder.

When it is desired to halve the fruit the knife B alone is used. To quarter it the knives C C' are added, and to divide the fruit into eight parts the knives D D' E E' are added, all the knives being removable, and few or many being held firmly in position by the collar F.

Having described my invention, what I claim therein as new and desire to secure by Letters Patent is—

The combination of the hollow mandrel A, the removable knives, and the collar F, constructed and operating substantially as described and represented.

The above specification of my improved fruit-slicer signed this 27th day of October, 1865.

JAMES H. REED.

Witnesses:
 ALEXR. A. C. KLAUCKE,
 W. F. HALL.